May 23, 1961 S. A. LUNDEEN 2,985,514
BRINE GENERATOR
Filed Jan. 15, 1958 2 Sheets-Sheet 1

INVENTOR.
STANLEY A. LUNDEEN
BY
ATTORNEYS

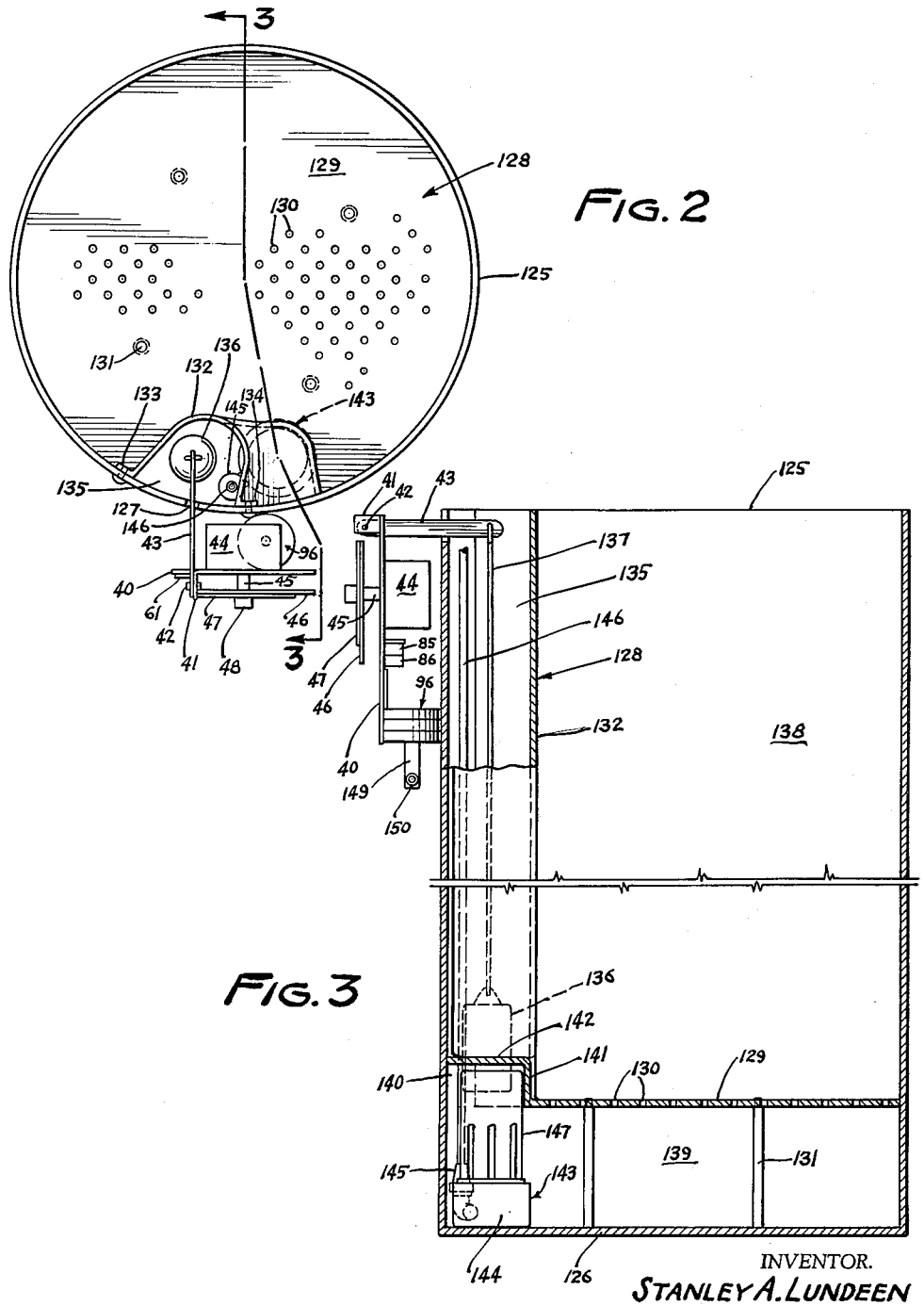

United States Patent Office 2,985,514
Patented May 23, 1961

2,985,514
BRINE GENERATOR
Stanley A. Lundeen, 2946 Stinson Blvd., Minneapolis, Minn.
Filed Jan. 15, 1958, Ser. No. 709,055
8 Claims. (Cl. 23—272)

This invention relates to a device for use in preparing a saturated salt solution for regenerating the mineral water softening bed of a water softening system. More particularly, this invention relates to a vessel for storing salt and for generating brine to revitalize the mineral bed of an automatic domestic water softening system.

The invention is illustrated by the drawings in which the same numerals refer to corresponding parts and in which:

Figure 2 is a top plan view of the vessel shown in Figure 1; and

Figure 3 is a vertical elevation, in section, taken on the line 3—3 of Figure 2 and in the direction of the arrows.

Figure 1:
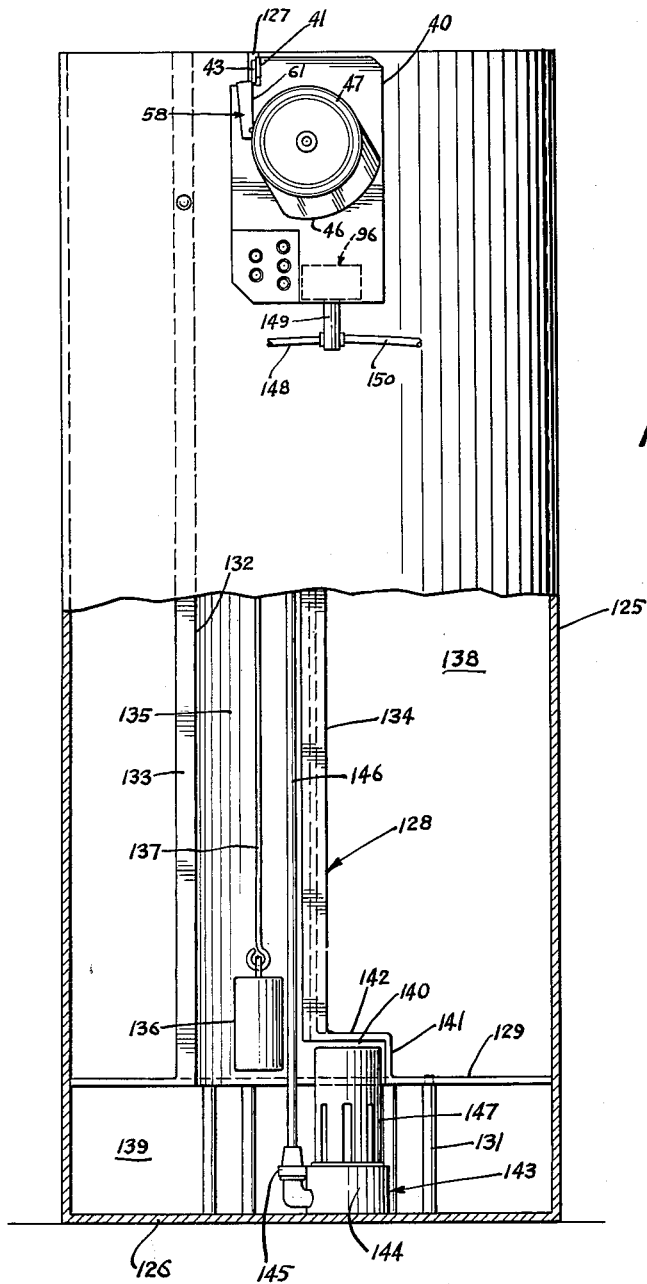
Figure 1 is a front elevation, partly in section, of a salt storage and brine generating tank according to this invention, shown in connection with control and strainer components of a water softening system.

Referring to the drawings, there is shown a vessel 125 adapted for use as a salt storage and brine generating vessel. The vessel 125 is preferably in the form of a cylindrical tank having a flat bottom 126 and composed of a material resistant to the corrosive effects of salt water. The tank 125 is desirably formed, for example, from a glass fiber reinforced synthetic resinous material, such as a polyester resin, or of metal, such as galvanized iron, provided with a heavy protective coating of a resin-based paint.

A time control device, such as is the subject of my co-pending application, Serial No. 693,481, filed October 30, 1957, is mounted on the outside wall of the tank 125. The time control device includes a mounting plate 40 having an upper forwardly projecting float arm bracket 41 to which a float arm 43 is pivotally secured at 42. A standard electric clock motor 44 is mounted on the back of mounting plate 40. The shaft 45 of the clock motor is provided with a face plate 46 which carries a clock dial face 47 secured by means of a nut 48. As explained in my aforesaid co-pending application, the time control device is inoperative except during those periods when the water softening system of which it is a part requires regeneration to revitalize the mineral water softening bed. The time control device is maintained in this inoperative condition by virtue of the float arm 43 being in contact with the vertical portion 61 of a latch arm 58 and restricting its movement.

The time control means includes a plurality of microswitches (of which two, 85 and 86, appear in these drawings) to control the operation of solenoid valves which in turn control water flows in the water softening system. The time control means also includes a vacuum operated time delay dashpot means 96. The functioning of the microswitches and the time delay means is merely incidental to and forms no direct part of the brine generating means which is the subject of this invention. They are included in this disclosure in order to provide a better understanding of the utility of this invention. The time control means is mounted adjacent the top of the tank 125 and a slot 127 in the top rim of the tank receives the float arm 43.

A brine generator device, indicated generally at 128, is disposed within the tank 125. The brine generator includes a horizontal bottom or floor member 129 provided with a plurality of perforations 130. The perforations 130 are preferably relatively fine and uniform in size and uniformly distributed over the entire area of the bottom 129. The bottom of the brine generator is held spaced apart from the bottom 126 of the tank 125 by means of a plurality of legs or post supports 131. The upper ends of the supports 131 are preferably of reduced diameter fit into correspondingly sized openings in the floor member 129 and to provide a weight bearing shoulder adjacent the upper end of the supports. The supports are then press-fit or otherwise secured into the lower surface of the bottom 129.

A generally arcuate and semi-circular vertical channel wall 132 extends upwardly from the bottom member 129 to the top rim of the tank 125, preferably adjacent one peripheral edge of the brine generator bottom. The channel wall member is provided with a pair of outwardly extending longitudinal flanges 133 and 134 adapted to fit against the inside wall surface of the tank 125. The flanges are secured to the tank wall by means of bolts or any equivalent fastening means, preferably adjacent to the top rim of the tank. The space defined by the inside wall of channel member 132 and the inside wall of the tank forms an elongated vertical tubular channel 135 within which a float 136 suspended by means of a rod or relatively stiff wire 137 from the free end of the float arm 43 is housed.

The larger space between the outside wall of the channel member 132, the inside wall of the tank 125 and above the perforated bottom wall 129 serves as a storage chamber 138 for salt used to generate brine. The somewhat smaller space 139 between the tank bottom wall 126 and the floor member 129 of the salt storage chamber serves as a reservoir for accumulating water for brine regeneration. Of course, no brine is generated until the level of accumulated water rises above the level of the perforated floor 129 of the salt storage chamber so that the water comes into contact with the stored salt. Thereafter, the chamber 139 also serves as a brine storage chamber.

The bottom end of the float channel 135 just above the level of the salt storage chamber floor 129 is enlarged to provide a cavity or recess 140 displaced laterally to one side of the channel 135 and adjacent to the inside wall of the tank 125. The cavity 140 is enclosed between an arcuate extension 141 of the lowermost edge of the channel wall 134 and by a top wall member 142. The cavity or recess 140 thus formed serves to position and house a float valve and salt strainer assembly indicated generally at 143. The float valve and salt strainer assembly is illustrated and described in detail in my co-pending application, Serial No. 496,802, filed March 25, 1955, for Automatic Water Softening System (now Patent No. 2,902,155 issued September 1, 1959), and includes a base 144 provided with a fitting 145 by which a brine removal tube 146 is connected into the valve assembly, and a perforated cage 147 which serves to retain the float ball of the float valve assembly and which is preferably screened over the perforations to filter out any silt or other foreign matter which might contaminate the brine.

The float valve and salt strainer assembly is inserted into the brine generator tank through the channel 135 and when it reaches the bottom of the tank, is pushed out of the way and held in position by means of the cavity 140. The float valve and strainer assembly can similarly readily be removed from the brine generator tank if such need arises. The brine withdrawal tube 146 passes up through the channel 135 and out of the tank.

Water for generation of brine within the tank 125 is introduced under pressure from a metering valve, such as illustrated and described in detail in my co-pending application, Serial No. 676,777, filed August 7, 1957, for Metering Valve. Such a valve meters out a small amount of water under pressure in proportion to the total volume of water passed through a water softening system during the period between regenerating cycles. This measured amount of water from the metering valve is introduced through tubing 148 to a T-fitting 149 connected to the time delay dashpot 96 of the time control means and thence through a tubing 150 to another T-fitting (not shown but connected to a venturi tube for applying suction for withdrawal of brine from the tank) and thence to the brine withdrawal tube 146.

The water from the metering valve thus flows under pressure in reverse flow through the brine withdrawal tube and the brine tank float valve assembly and into the chamber 139 at the bottom of the brine generating tank. Water is metered into the brine generating tank in a predetermined fixed proportion to the total volume of water passed through the water softening system, of which this device is a part. Essentially, this water remains relatively fresh except for residual salt it may wash free in the course of its back flow through the brine withdrawal tube and float valve assembly and residual brine remaining in the bottom of the tank.

As the time for regeneration approaches, as determined by the volume of water passed through the water softening system and the smaller volume of water metered into the brine generating tank, the level of the accumulated metered water rises to above the surface of the perforated bottom wall 129 of the salt storage chamber. When this occurs, of course, the relatively fresh stored water contacts the salt stored in the salt storage chamber 138. Since brine is more dense than fresh water and saturated brine is more dense than partially saturated brine, a circulating flow is set up in the stored water as the exposed salt at the bottom of the storage chamber is dissolved and the resulting denser brine tends to gravitate to the bottom of the tank forcing the relatively fresh water upward for contact with the stored salt and generation of additional brine.

More efficient and rapid brine generation is achieved as the result of this circulating flow and the contact of the stored salt with the freshest and least saturated water than is possible where stored salt impedes such circulation, as in conventional water softening systems. A substantially saturated brine solution is thus formed in the time period just shortly preceding the time this brine will be used for regeneration of the mineral bed of the water softening system.

The float 136 is so adjusted with respect to the level of the brine generated in the tank that as the time for needed regeneration approaches, sufficient water has been metered into the brine generating tank and sufficient brine generated that the level of float 136 is raised slightly. The resulting upward pressure against the connecting link 137 lifts the float arm 43 and releases the latch arm 58 to render the control device operative to initiate the regeneration cycle at the next following preselected convenient hour for regeneration.

At the preselected convenient time, the regeneration cycle is begun and, preferably after giving the mineral bed a backwash of fresh water, a water flow is initiated by actuation of solenoid valves through a venturi tube and into the tank containing the mineral bed. This flow of water through a venturi tube to which the brine withdrawal tube 146 is connected creates a suction which withdraws the brine through the float valve assembly and out through the brine withdrawal tube 146. It may be mentioned that while there is liquid in the chamber 139 the ball of the float valve assembly floats free within the retaining cage 147 leaving that valve open. Upon withdrawal of the brine from the brine tank, the float valve is drawn by suction into its valve seat to create a vacuum within the brine withdrawal tube 146 which is transmitted through the T-fitting and tubing 150 to the vacuum operated time delay dashpot mechanism 96 of the time control means.

The brine generating device 128 is preferably molded from material resistant to the corrosive effects of salt water such as glass fiber reinforced synthetic plastic material, such as polyester resin. The perforated raised floor member 129 is of a size and shape corresponding to the transverse section of the tank 125 and sized to fit closely against the walls of the tank. The perforated floor of the brine generator and the supporting legs should be sufficiently strong to support several months supply of salt for storage. In a typical installation in which the brine tank had an inside diameter of about 15½" and was 3' deep, the perforated floor 129 was spaced approximately 4" from the bottom wall 126 of the tank, and the salt chamber 138 had a capacity of about 250 pounds of salt. This same floor member 129 was perforated with about 200 $\frac{3}{16}$" holes distributed uniformly across its surface.

Use of the brine generating device of this invention offers many advantages. One of the foremost of these is the rapid and efficient generation of brine made possible by the circulating flow in the prepared brine which is just partially in contact with the stored salt supply. Unlike conventional brine tanks, the brine generator according to this invention allows the preparation of 100 percent saturated brine without the necessity of maintaining a substantial excess of salt stored in the storage chamber. Heretofore, it has been necessary that the salt storage tank be maintained at least about one-half full at all times in order to insure saturation of the brine.

At the same time, the use of this brine generator insures uniformity of brine regardless of the amount of salt in the storage chamber. This is because excess dissolved salt present in the brine is not an important factor in determining the level of brine at which the float will be lifted to permit initiation of the regeneration cycle. Where the stored salt and brine are in a single undivided vessel, the space occupied by undissolved excess salt is a material factor in determining the brine level. Because the excess undissolved salt is maintained out of contact with the strainer by means of the perforated floor of the salt storage chamber, clogging of the strainer by undissolved excess salt caked about the strainer is eliminated. At the same time, caking in the salt storage chamber itself is eliminated. This is because all of the stored salt except that in the bottommost layer of the salt storage chamber is maintained out of contact with water. Because of the presence of the access channel, the salt strainer may be readily removed for inspection, cleaning, repair or replacement without the necessity of moving any salt from the salt storage vessel.

It is apparent that many modifications and variations of this invention as hereinbefore set forth may be made without departing from the spirit and scope thereof. The specific embodiments described are given by way of example only and the invention is limited only by the terms of the appended claims.

I claim:

1. In a water softening system comprising a closed vessel containing a bed of mineral water softening material, means for inducing flow of hard water from a hard water source through said bed of mineral water softening material to soften said water before discharge to a soft water outlet during a water softening cycle, means for inducing a flow of brine through said bed of mineral water softening material to regenerate said mineral bed before discharge of the brine to a drain during a regeneration cycle, and a brine tank associated with said closed vessel containing water softening mineral for preparing a saturated salt solution for revitalizing said mineral bed, the improvement which consists in providing a salt storing and brine generating device positioned in said brine tank to support salt out of contact with water except during a period of brine generation preceding regeneration of said mineral bed, said brine generating device comprising a horizontal perforated floor member disposed to divide said tank into a relatively larger upper salt storage chamber and a relatively smaller lower water storage chamber, means for supporting said perforated floor member spaced from the bottom of said tank, a vertical channel separated from said salt storage chamber and extending upwardly from said floor member, said channel being open at the top and bottom and communicating freely with said water storage chamber below said floor member, duct means extending through said channel for introducing water to the water storage chamber of said tank and for withdrawing brine therefrom, float means in said channel adjacent the level of said perforated floor member, and link means connecting said float means with control means for regulating water flows within said system for actuating said control means when the level of water in said water storage chamber rises above the level of said perforated floor member.

2. A water softening system according to claim 1 further characterized in that said vertical channel of said brine generating device is generally semi-cylindrical in shape and disposed adjacent the peripheral edge of said bottom member whereby the inside wall of said tank forms one wall of said channel.

3. A water softening system according to claim 1 further characterized in that said horizontal perforated floor member of said brine generating device is provided with a plurality of at least three leg supports upon its lower surface to hold said floor member spaced apart from the bottom wall of said tank.

4. A water softening system according to claim 1 further characterized in that the bottom end of said vertical channel of said brine generating device above the top surface of said floor member is enlarged to provide a recess displaced laterally from said channel adjacent to the periphery of said floor member.

5. A water softening system according to claim 4 further characterized in that said laterally displaced recess is enclosed at the top.

6. A water softening system according to claim 1 further characterized in that said brine generating device is composed of a material resistant to the corrosive effects of brine.

7. A water softening system according to claim 6 further characterized in that said brine generating device is composed of glass fiber reinforced synthetic resinous material.

8. In a water softening system comprising a closed vessel containing a bed of mineral water softening material, means for inducing flow of hard water from a hard water source through said bed of mineral water softening material to soften said water before discharge to a soft water outlet during a water softening cycle, means for inducing a flow of brine through said bed of mineral water softening material to regenerate said mineral bed before discharge of the brine to a drain during a regeneration cycle, and a brine tank associated with said closed vessel containing water softening mineral for preparing a saturated salt solution for revitalizing said mineral bed, the improvement which consists in providing a salt storing and brine generating device positioned in said brine tank for supporting salt out of contact with water except during a period of brine generation preceding regeneration of said mineral bed, said brine generating device comprising a horizontal perforated floor member disposed to divide said tank into a relatively larger upper salt storage chamber and a relatively smaller lower water storage chamber; a plurality of at least three leg supports upon the lower surface of said floor member to hold said floor member spaced apart from the bottom wall of the tank; a vertical channel separated from said salt storage chamber and extending upwardly from said floor member, said channel being semi-cylindrical in shape, open at the top and communicating with said water storage chamber below said floor member, and disposed adjacent the peripheral edge of said bottom member whereby the inside wall of said tank forms one wall of said channel, duct means extending through said channel for introducing water to the water storage chamber of said tank and for withdrawing brine therefrom, float means in said channel adjacent the level of said perforated floor member, link means connecting said float means to control means for initiating regeneration of said mineral water softening bed when the level of water in said water storage chamber rises above the level of said perforated floor member, longitudinal flanges extending outwardly from said vertical channel and abutting the inside walls of said tank; the bottom end of said channel immediately above the top surface of said floor member being enlarged to provide a recess displaced laterally from said channel adjacent to the periphery of the floor member, said recess being enclosed at the top; said brine generating device being composed of a material resistant to the corrosive effects of brine.

References Cited in the file of this patent

UNITED STATES PATENTS

| | | |
|---|---|---|
| 631,840 | Wood | Aug. 29, 1899 |
| 951,206 | Teas | Mar. 8, 1910 |
| 1,940,217 | Lane | Dec. 19, 1933 |

OTHER REFERENCES

Fetter: Chem. Engineering of November 1949, pp. 120–124.